US012795645B2

(12) United States Patent
Liu

(10) Patent No.: US 12,795,645 B2
(45) Date of Patent: Nov. 10, 2026

(54) METHOD AND APPARATUS FOR IDENTIFYING REMOTE TERMINAL SERVICE, DEVICE, AND STORAGE MEDIUM

(71) Applicant: VIVO MOBILE COMMUNICATION CO., LTD., Guangdong (CN)

(72) Inventor: Jiamin Liu, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 404 days.

(21) Appl. No.: 18/308,591

(22) Filed: Apr. 27, 2023

(65) Prior Publication Data

US 2023/0345462 A1 Oct. 26, 2023

Related U.S. Application Data

(63) Continuation of application No. PCT/CN2021/135984, filed on Dec. 7, 2021.

(30) Foreign Application Priority Data

Dec. 14, 2020 (CN) ......................... 202011476469.4

(51) Int. Cl.
*H04W 72/1263* (2023.01)
*H04W 88/04* (2009.01)

(52) U.S. Cl.
CPC ........ *H04W 72/1263* (2013.01); *H04W 88/04* (2013.01)

(58) Field of Classification Search
CPC .......................... H04W 72/1263; H04W 88/04
See application file for complete search history.

(56) References Cited

U.S. PATENT DOCUMENTS

2018/0234524 A1* 8/2018 Cheng .................. H04W 76/15
2018/0287689 A1 10/2018 Lee et al.
2018/0343558 A1 11/2018 Ma
(Continued)

FOREIGN PATENT DOCUMENTS

CN 106658380 A 5/2017
CN 108496330 A 9/2018
(Continued)

OTHER PUBLICATIONS

Extended European Search Report for Application No. 21905573.8, dated Dec. 21, 2023, 11 Pages.
(Continued)

*Primary Examiner* — Saad A. Waqas
(74) *Attorney, Agent, or Firm* — Perilla Knox & Hildebrandt; Kenneth A. Knox

(57) ABSTRACT

A method and an apparatus for identifying remote terminal service, a device, and a storage medium, and pertains to the field of communication technologies. The method includes: receiving a first message from a first remote terminal; determining a relay bearer channel for forwarding the first message; and forwarding the first message to a peer communication device over the relay bearer channel, where a packet header of the first message carries a terminal identifier and/or bearer identifier of the first remote terminal; where the peer communication device is a network-side device, a next-hop relay terminal, or a second remote terminal.

15 Claims, 8 Drawing Sheets

(56) References Cited

U.S. PATENT DOCUMENTS

| | | | |
|---|---|---|---|
| 2019/0029070 | A1 | 1/2019 | Feng |
| 2019/0166486 | A1 | 5/2019 | Tang |
| 2019/0261450 | A1 | 8/2019 | Adachi et al. |
| 2019/0394700 | A1 | 12/2019 | Lekutai |
| 2020/0022194 | A1 | 1/2020 | Wang et al. |
| 2020/0120728 | A1 | 4/2020 | Wallentin et al. |

FOREIGN PATENT DOCUMENTS

| | | | | |
|---|---|---|---|---|
| CN | 110326359 | A | 10/2019 | |
| JP | 2019504567 | A | 2/2019 | |
| WO | 2017206186 | A1 | 12/2017 | |
| WO | 2018084199 | A1 | 5/2018 | |
| WO | WO-2019059638 | A1 * | 3/2019 | ............ H04W 80/08 |

OTHER PUBLICATIONS

First Office Action for Japanese Application No. 2023-527817, dated Feb. 29, 2024, 6 Pages.

International Search Report and Written Opinion for Application No. PCT/CN2021/135984, dated Mar. 1, 2022, 6 Pages.

Intel Corporation "Impact on user plane protocol stack and control plane procedure for Sidelink relay" 3GPP TSG-RAN WG2 Meeting#111e, E-meeting, Aug. 2020, R2-2007608, 10 Pages.

* cited by examiner

METHOD AND APPARATUS FOR IDENTIFYING REMOTE TERMINAL SERVICE, DEVICE, AND STORAGE MEDIUM

CROSS-REFERENCE TO RELATED APPLICATIONS

This application is a continuation of PCT Application No. PCT/CN2021/135984 filed on Dec. 7, 2021, which claims priority to Chinese Patent Application No. 202011476469.4 filed on Dec. 14, 2020, which are incorporated herein by reference in their entireties.

TECHNICAL FIELD

This application pertains to the field of communication technologies, and specifically relates to a method and an apparatus for identifying remote terminal service, a device, and a storage medium.

BACKGROUND

Starting from Release 12, long term evolution (LTE) systems support sidelinks for direct data transmission between terminals (User Equipment, UE) without using a network-side device. In a typical sidelink relay scenario, data between a remote terminal (remote UE) and a base station is forwarded by a relay terminal (relay UE) over a sidelink between the remote terminal and the relay terminal. In this scenario, the remote UE and the base station perform data transmission, and the relay UE relays data.

In the related art, below a Uu interface-oriented Uu packet data convergence protocol (Uu PDCP) layer for remote terminals, there is an adaptation layer. The adaptation layer is mainly used for multiplexing remote UE services, namely, multiplexing multiple remote UE services onto one Uu RB (radio bearer) for transmission. However, the related art proposes only the basic function of the adaptation layer, but does not specify how the adaptation layer differentiates different remote UE services during multiplexing of remote UE services. Therefore, the adaptation layer is currently unusable.

SUMMARY

According to a first aspect, a method for identifying remote terminal service is provided and applied to a relay terminal. The method includes receiving a first message from a first remote terminal; determining a relay bearer channel for forwarding the first message; and forwarding the first message to a peer communication device over the relay bearer channel, where a packet header of the first message carries a terminal identifier and/or bearer identifier of the first remote terminal; where the peer communication device is a network-side device, a next-hop relay terminal, or a second remote terminal.

According to a second aspect, a method for identifying remote terminal service is provided and applied to a network-side device. The method includes receiving a first message that is transmitted by a relay terminal over a relay bearer channel, where a packet header of the first message carries a terminal identifier and/or bearer identifier of a first remote terminal.

According to a third aspect, a method for identifying remote terminal service is provided and applied to a remote terminal. The method includes receiving a first message that is transmitted by a relay terminal over a relay bearer channel, where a packet header of the first message carries a terminal identifier of a first remote terminal and/or a bearer identifier of the first remote terminal.

According to a fourth aspect, an apparatus for identifying remote terminal service is provided and applied to a relay terminal. The apparatus includes: a first receiving unit configured to receive a first message from a first remote terminal; a first processing unit configured to determine a relay bearer channel for forwarding the first message; and a first transmitting unit configured to forward the first message to a peer communication device over the relay bearer channel, where a packet header of the first message carries a terminal identifier and/or bearer identifier of the first remote terminal; where the peer communication device is a network-side device, a next-hop relay terminal, or a second remote terminal.

According to a fifth aspect, an apparatus for identifying remote terminal service is provided and applied to a network-side device. The apparatus includes a fifth receiving unit configured to receive a first message that is transmitted by a relay terminal over a relay bearer channel, where a packet header of the first message carries a terminal identifier and/or bearer identifier of a first remote terminal.

According to a sixth aspect, an apparatus for identifying remote terminal service is provided and applied to a terminal. The apparatus includes a sixth receiving unit configured to receive a first message that is transmitted by a relay terminal over a relay bearer channel, where a packet header of the first message carries a terminal identifier of a first remote terminal and/or a bearer identifier of the first remote terminal.

According to a seventh aspect, a terminal is further provided. The terminal includes a processor, a memory, and a program or instructions stored in the memory and capable of running on the processor. When the program or the instructions are executed by the processor, the steps of the method according to the first aspect are implemented, or the steps of the method according to the third aspect are implemented.

According to an eighth aspect, a network-side device is provided. The network-side device includes a processor, a memory, and a program or instructions stored in the memory and capable of running on the processor. When the program or instructions are executed by the processor, the steps of the method according to the second aspect are implemented.

According to a ninth aspect, a readable storage medium is provided. The readable storage medium stores a program or instructions, and when the program or the instructions are executed by a processor, the steps of the method according to the first aspect are implemented, the steps of the method according to the second aspect are implemented, or the steps of the method according to the third aspect are implemented.

According to a tenth aspect, a chip is provided. The chip includes a processor and a communication interface, where the communication interface is coupled to the processor, and the processor is configured to run a program or instructions on a terminal or a network-side device to implement the steps of the method according to the first aspect, the steps of the method according to the second aspect, or the steps of the method according to the third aspect.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application shall fall within the scope of this application.

The terms "first", "second", and the like in this specification and claims of this application are used to distinguish between similar objects rather than to describe a specific order or sequence. It should be understood that data used in this way is used interchangeably in appropriate circumstances such that the embodiments of this application can be implemented in other orders than the order illustrated or described herein. In addition, objects differentiated by "first" and "second" are generally of a same type, and the quantities of the objects are not limited, for example, there may be one or more first objects. In addition, in this specification and claims, "and/or" indicates at least one of the connected objects, and the character "/" generally indicates an "or" relationship between the contextually associated objects.

It should be noted that the technologies described in the embodiments of this application are not limited to long term evolution (LTE)/LTE-advanced (LTE-A) systems, but may also be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. However, in the following descriptions, a new radio (NR) system is described for illustration purposes, and NR terms are used in most of the following descriptions, although these technologies may also be applied to other applications than the NR system application, for example, the$6^{th}$ generation (6G) communication system.

Figure 1:
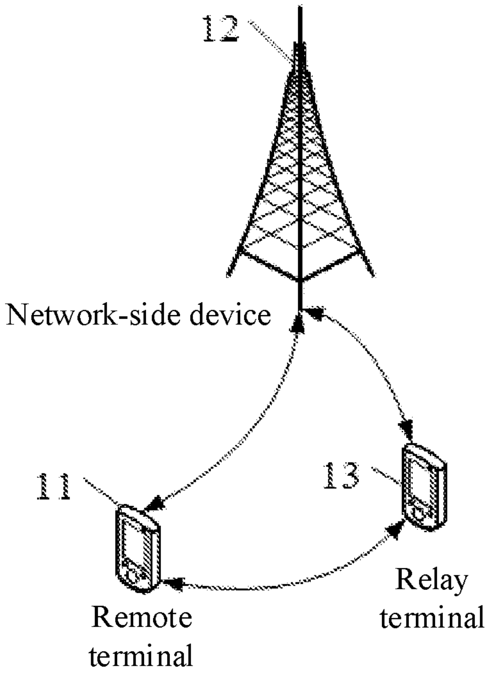
FIG. 1 is a block diagram of a wireless communication system to which the embodiments of this application are applicable.

FIG. 1 is a block diagram of a wireless communication system to which the embodiments of this application are applicable. The wireless communication system includes a remote terminal 11, a network-side device 12, and a relay terminal 13. The remote terminal 11/relay terminal 13 may also be referred to as a terminal device or user equipment (UE). The remote terminal 11/relay terminal 13 may be a terminal-side device such as a mobile phone, a tablet personal computer, a laptop computer or notebook computer, a personal digital assistant (PDA), a palmtop computer, a netbook, an ultra-mobile personal computer (UMPC), a mobile internet device (MID), a wearable device, or vehicle user equipment (VUE), or pedestrian user equipment (PUE). The wearable device includes wrist bands, earphones, glasses, and the like. It should be noted that the terminal is not limited to a specific type in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a 5G base station (gNB) in a 5G network architecture (next generation system), a home NodeB, a home evolved NodeB, a WLAN access point, a Wi-Fi node, a transmitting receiving point (TRP), or another appropriate term in the art. As long as the same technical effect is achieved, the base station is not limited to a specific technical term. It should be noted that the base station in the NR system is taken only as an example in the embodiments of this application, but the base station is not limited to a specific type.

The following describes in detail a remote terminal service identification method and apparatus, a device, and a storage medium that are provided in the embodiments of this application through specific embodiments and application scenarios thereof with reference to the accompanying drawings.

For better understanding of the embodiments of this application, sidelink relay is first described.

Figure 2:
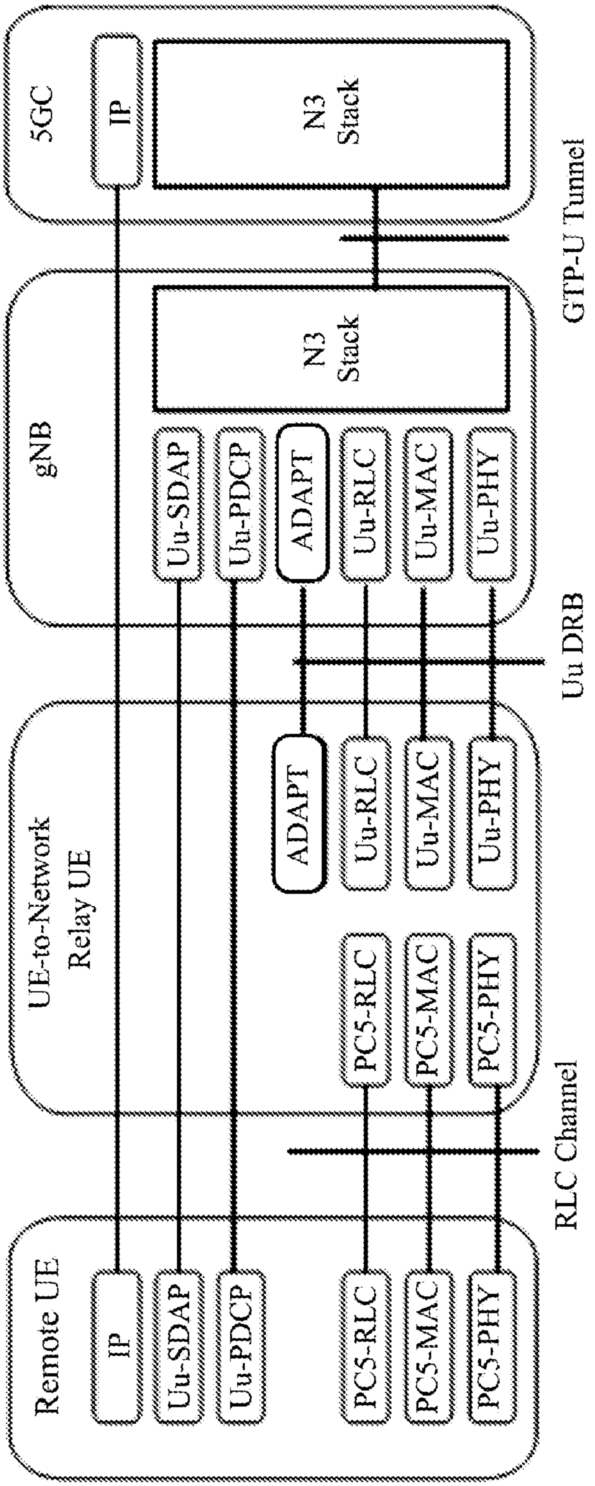
FIG. 2 is a schematic diagram of an architecture of an L2 relay protocol stack in the related art.

FIG. 2 is a schematic diagram of an architecture of an L2 relay protocol stack in the related art, and FIG. 2 shows an L2 relay protocol stack used by a remote terminal to communicate with a network-side device via a relay terminal (that is, over a relay bearer).

A Uu PDCP protocol stack is present between the relay terminal and the network-side device. In the Uu PDCP protocol stack, several radio bearers (Radio Bearer, RB) for data transmission of the remote terminal are covered.

Below the Uu PDCP protocol stack of the relay terminal, there is an adaptation layer, such as ADAPT in FIG. 2. The adaptation layer is a new protocol layer that is mainly for multiplexing of remote UE services to multiplex multiple remote UE services onto one Uu RB (Radio Bearer) for transmission.

The relay terminal itself also has data to transmit. Therefore, the adaptation layer needs to differentiate data of the relay terminal and data of a remote terminal or between data of different remote terminals. Specifically, a logical entity of the adaptation layer needs to determine whether data comes from/goes to the remote terminal or the relay terminal, and which bearer of which remote terminal data belongs to. Below the adaptation protocol layer are a radio link control (RLC) layer, a medium access control (MAC) layer, and a physical (PHY) layer for a Uu interface. In addition, there may be an adaptation layer on a PC5 interface, namely, between remote UE and relay UE, for service multiplexing.

In the prior art, only the basic function of the adaptation layer is proposed, and no solution is proposed on how the adaptation layer differentiates services of different remote UEs, how content of a UE ID is determined, and how a UE ID is assigned. Therefore, the adaptation layer is currently unusable.

Figure 3:
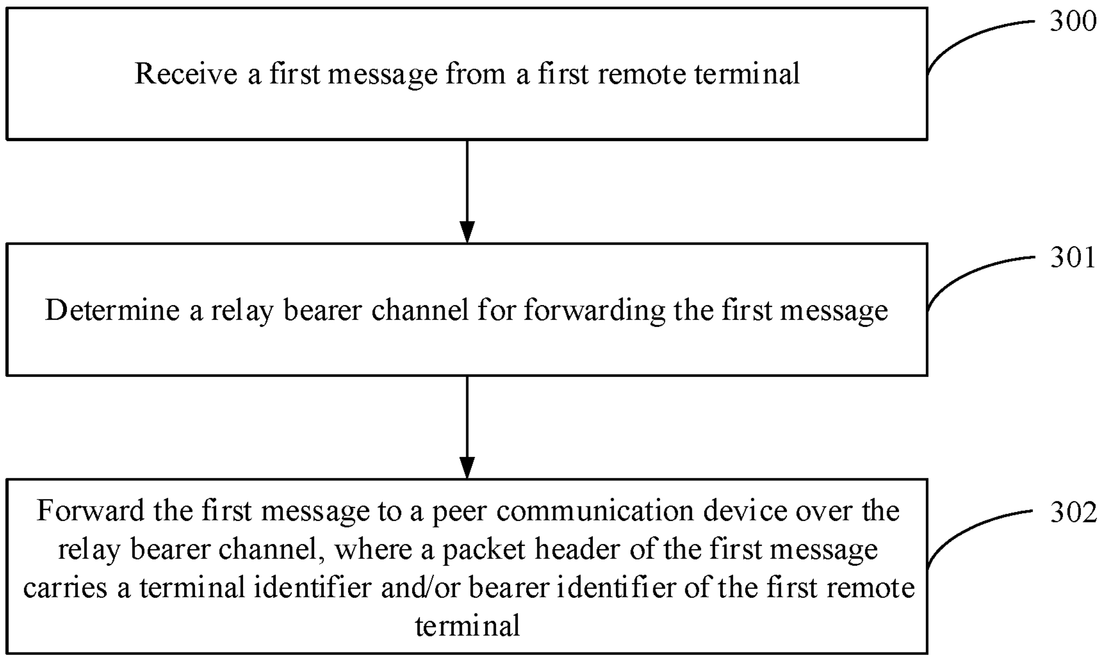
FIG. 3 is a first schematic flowchart of a method for identifying remote terminal service according to an embodiment of this application.

FIG. 3 is a first schematic flowchart of a method for identifying remote terminal service according to an embodiment of this application. The method is performed by a relay terminal (relay UE). As shown in FIG. 3, the method includes the following steps.

Step 300. Receive a first message from a first remote terminal. It can be understood that when the remote terminal remote UE and the relay terminal (relay UE) satisfy a relay communication condition, the remote UE transmits the first message to the relay UE on a PC5 interface. The PC5 interface is a sidelink interface between the remote UE and the relay UE. The first message is transmitted by the first remote terminal to a peer communication device and is forwarded to the peer communication device via the relay UE.

In this embodiment of this application, a bearer type of the first message may be signaling radio bearer (SRB) 0, SRB1, SRB2 or data radio bearer (DRB). The relay terminal (relay UE) receives the first message from the first remote terminal on the PC5 interface.

It should be noted that the first message from the first remote terminal may or may not carry a terminal identifier and/or bearer identifier of the first remote terminal.

Step 301. Determine a relay bearer channel for forwarding the first message.

In this embodiment of this application, the relay UE may multiplex services of each of all remote terminals mapped to a same radio link control channel onto a same large path for transmission, or multiplex services from a same remote terminal but to different peer communication devices. After receiving the first message from the first remote terminal, the relay UE needs to determine which relay bearer channel is to be used to forward the first message to the peer communication device.

It can be understood that the relay bearer channel is used to carry end-to-end RB data of the remote terminal. The relay bearer channel may be a relay radio link control channel relay RLC channel.

Optionally, the relay UE determines the relay bearer channel for forwarding the first message based on a PC5 logical channel identifier corresponding to the first message, an SRB0 identifier of the first message, or an end-to-end bearer identifier of the first remote terminal.

Step 302. Forward the first message to the peer communication device over the relay bearer channel, where the packet header of the first message carries the terminal identifier and/or bearer identifier of the first remote terminal. The relay UE forwards the first message to the peer communication device over the relay bearer channel and adds the terminal identifier UE ID and/or bearer identifier RB ID of the first remote terminal to a packet header of the first message. A network-side device can differentiate bearers for different remote UEs based on the UE ID and/or RB ID carried in the packet header of the first message, thereby identifying services of remote terminals (remote UE).

Optionally, in this embodiment of this application, the peer communication device may be a network-side device, a next-hop relay terminal, or a second remote terminal.

An application scenario of this embodiment of this application may be a U2N (UE to NW) scenario: remote UE<->relay UE<->NW, where multiple hops may be present, that is, multiple serial relay UEs are present. In a scenario of one relay UE nearest to the remote UE being denoted as access relay UE and one relay UE connected to the NW being denoted as root relay UE, if bearer multiplexing is required between current relay UE and next-hop or previous-hop relay UE, between the root relay UE and the NW, and between the access relay UE and the remote UE, a UE ID and/or RB ID may be used to differentiate the remote UE and a bearer.

An application scenario of this embodiment of this application may be a U2U (UE to UE) scenario: source remote UE<->relay UE<->target remote UE, where multiple hops may be present, that is, multiple serial relay UEs are present. In a scenario of one relay UE nearest to the source remote UE being denoted as access relay UE and one relay UE connected to the target remote UE being denoted as root relay UE, if bearer multiplexing is required between current relay UE and next-hop or previous-hop relay UE, between the root relay UE and the target remote UE, and between the access relay UE and the source remote UE, a UE ID and/or RB ID may be used to differentiate the remote UE and a bearer.

In this embodiment of this application, services of different remote UEs are differentiated during multiplexing of remote UE services so that a relay terminal can multiplex different services of different remote terminals onto a same transmit path for transmission, improving the transmission efficiency and improving identifiability of remote terminal services in end-to-end transmission, thereby guaranteeing the quality of service of remote terminal services, guaranteeing the overall efficiency, and guaranteeing the system efficiency while improving user experience.

Optionally, the determining a relay bearer channel for forwarding the first message includes:

determining a type of the first message based on a PC5 logical channel identifier corresponding to the first message, an SRB0 identifier of the first message, or an end-to-end bearer identifier of the first remote terminal; and in a case that the type of the first message is SRB0 message, determining that the relay bearer channel for forwarding the first message is a first default radio link control channel, or in a case that the type of the first message is not SRB0 message, determining, based on mappings between radio bearer data types and radio link control channels, that the relay bearer channel for forwarding the first message is a radio link control channel having a mapping to the type of the first message.

It can be understood that the relay UE first determines the type of the first message based on the PC5 logical channel identifier corresponding to the first message, the SRB0 identifier of the first message, or the end-to-end bearer identifier of the first remote terminal; and then determines the relay bearer channel based on the type of the first message.

The SRB0 message is a radio resource control (RRC) setup request. Therefore, the relay UE needs to have a default relay RLC channel configuration for carrying the SRB0 message. Therefore, in this embodiment of this application, the type of the first message includes two categories: SRB0 message and non-SRB0 message.

To implement bearer multiplexing, the network-side device needs to configure the first default radio link control channel for the SRB0 message. The first default radio link control channel is used to carry the SRB0 message. The network-side device further needs to configure mappings for other non-SRB0 messages. The mappings are specifically mappings between radio bearer data types and radio link control channels.

In a case that the type of the first message is SRB0 message, the relay UE determines that the relay bearer channel for forwarding the first message is the first default radio link control channel.

In a case that the type of the first message is not SRB0 message, the relay UE determines, based on the mappings between radio bearer data types and radio link control channels, that the relay bearer channel for forwarding the first message is a radio link control channel having a mapping to the type of the first message.

In an embodiment, the relay UE determines the type of the first message based on the PC5 logical channel identifier corresponding to the first message; and then determines the relay bearer channel based on the type of the first message.

Data on the PC5 interface may be differentiated in the following manner: mapping different Uu RBs one by one to PC5 RBs for identification and differentiation. For example, logical channels 0 to 3 on the PC5 interface are for existing PC5 signaling, logical channels 4 and 5 are for legacy PC5 services, logical channel 10 is for remote UE Uu SRB0, logical channel 11 is for remote UE Uu SRB1, logical channel 12 is for remote UE Uu SRB2, logical channel 14 is for remote UE Uu DRB1, logical channel 15 is for remote UE Uu DRB2, and so on.

Figure 4:
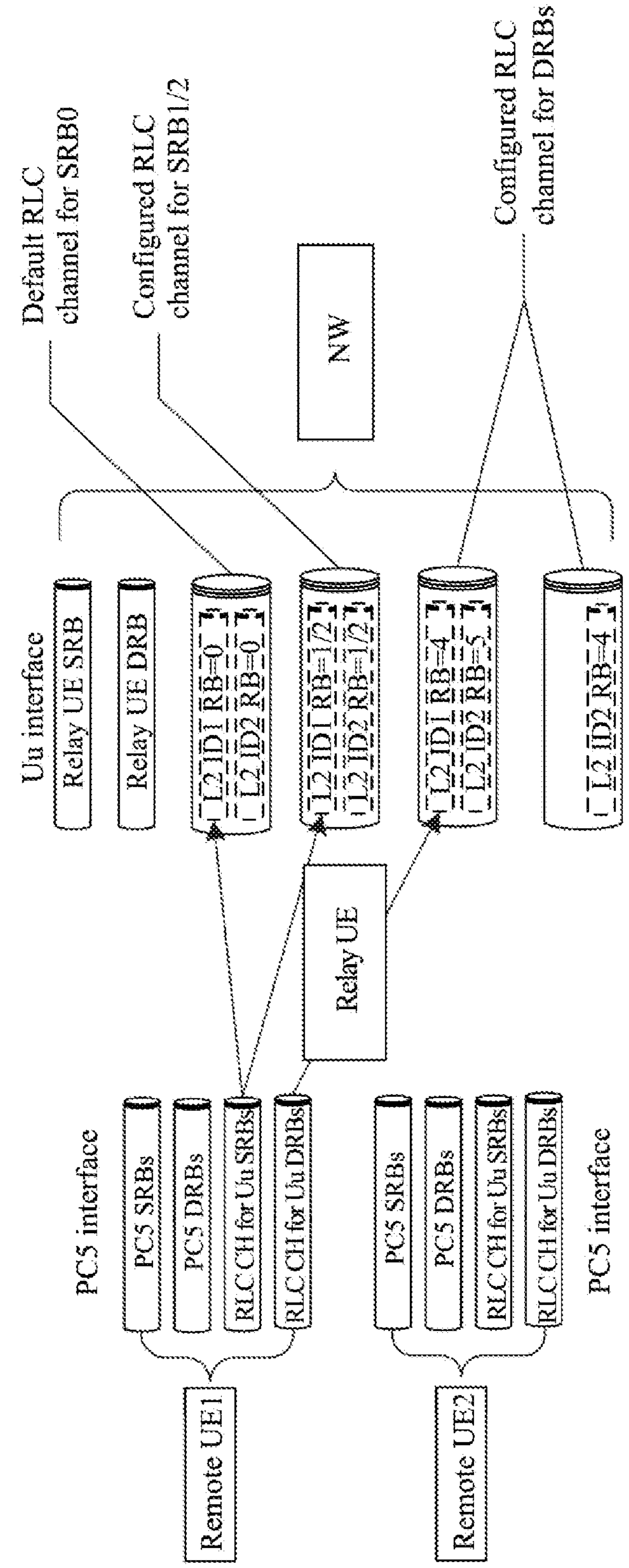
FIG. 4 is a schematic diagram of two UEs connected to a network via one relay UE according to an embodiment of this application.

FIG. 4 is a schematic diagram of two UEs connected to a network via one relay UE according to an embodiment of this application. As shown in FIG. 4, at the PC5 interface, there may be legacy PC5 SRBs, PC5 DRBs, RLC channels for Uu SRBs, RLC channels for Uu DRBs, and the like between each remote UE and the relay UE. All types of bearers may be separate paths for easy data differentiation of relay UE.

For example, logical channels between remote UE1 and relay UE are categorized as follows: logical channels 0 to 3: corresponding to PC5 SRB0, SRB1, SRB2, and SRB3, respectively, which are the existing types of PC5 bearers; logical channels 4 to 14: corresponding to PC5 DRB1 to DRB11, respectively; logical channel 15: default or configured relay RLC channel for Uu SRB0 of remote UE1; logical channels 16 and 17: configured relay RLC channels for Uu SRB1 and SRB2 of remote UE1; logical channels 18 to 31: configured relay RLC channels for Uu DRB1 to DRB14 of remote UE1; and logical channels 32 to 63: extended logical channels on the Uu interface.

If the relay UE receives content on the foregoing PC5 bearers, for bearers on the PC5 interface, the relay UE directly follows an existing procedure. For data on RLC channels, the relay UE needs to forward the data to the network-side device.

Upon receiving the first message, the relay UE may determine the type of the first message based on the PC5 logical channel identifier corresponding to the first message. For example, if the PC5 logical channel identifier corresponding to the first message received by the relay UE is 15, because logical channel 15 is for Uu SRB0, the type of the first message in this case may be determined to be SRB0 message.

In an embodiment, the relay UE determines the type of the first message based on the SRB0 identifier of the first message, and thus determines the relay bearer channel for forwarding the first message. For example, if the SRB0 identifier of the first message is 0, it indicates that the first message is not an SRB0 message, and the relay bearer channel for forwarding the first message may be determined based on the mappings, between radio bearer data types and radio link control channels RLC channels, configured on the network side. If the SRB0 identifier of the first message is 1, it indicates that the first message is an SRB0 message, and the first default radio link control channel default relay RLC channel is used as the relay bearer channel for the first message.

Optionally, the relay UE determines the type of the first message based on the end-to-end bearer identifier of the first remote terminal, and thus determines the relay bearer channel for forwarding the first message. The end-to-end bearer identifier of the first remote terminal is an RB ID for communication between the first remote terminal and the network side. For example, remote UE Uu SRB0 has an RB ID=0, remote UE SRB1 has an RB ID=1, remote UE SRB2 has an RB ID=2, and remaining DRBs have an RB ID configured and assigned through an end-to-end RRC procedure. For example, if the end-to-end bearer identifier of the first remote terminal is 1, the type of the first message is SRB1 message, and the relay UE determines the relay bearer channel for forwarding the first message based on the mappings, between radio bearer data types and radio link control channels RLC channels, configured on the network side.

In some optional embodiments, the determining a relay bearer channel for forwarding the first message further includes:

in a case that the type of the first message is not SRB0 message and that a radio link control channel having a mapping to the type of the first message is absent, determining that the relay bearer channel for forwarding the first message is a second default radio link control channel configured on a network side.

In some cases, if the network side has not configured a mapping between the type of the first message and a radio link control channel, the second default radio link control channel is used as the relay bearer channel for forwarding the first message. The second default radio link control channel is used to carry radio bearer data of a remote terminal and having configured no mappings.

The second default radio link control channel is the same as or different from the first default radio link control channel.

In this embodiment of this application, the relay bearer channel is determined based on the PC5 logical channel identifier corresponding to the first message from the remote terminal, the SRB0 identifier, or the end-to-end bearer identifier, multiplexing different services of different remote terminals in a same transmit path for transmission, thereby improving the transmission efficiency.

Optionally, the terminal identifier includes one of the following: PC5 link layer-2 identifier PC5 link L2 ID;

part of bits of PC5 link L2 ID; unique index of remote terminal on relay terminal; and unique index of remote terminal on network-side device.

In this embodiment of this application, the terminal identifier UE ID may be a PC5 link layer-2 identifier PC5 link L2 ID of the terminal identifier. A PC5 link L2 ID is an L2 ID used by remote UE and relay UE for communication on the PC5 interface, having a length of 24 bits.

PC5 link L2 IDs are IDs used for existing PC5 communication, can ensure a unique UE identity in a certain range, and are convenient to use. However, the disadvantage is large overheads: 24 bits are needed for each UE for identification and differentiation.

To reduce overheads, the 24-bit L2 ID can also be truncated, for example, taking 16 least significant bits, but the cost of doing so is the possibility of duplicate UE IDs.

The main purpose of UE IDs is to differentiate different remote UEs connected to a same relay UE or different remote UEs mapped to a same radio link control channel. Therefore, another defining and assigning manner may also be considered to obtain smaller UE ID lengths, thereby reducing overheads and improving resource utilization.

In some optional embodiments, the terminal identifier may also be a unique index of remote terminal on relay terminal, namely, a unique index assigned by the relay terminal to the remote terminal.

Optionally, the method for identifying remote terminal service further includes: assigning a terminal identifier index to each of all remote terminals connected to the relay terminal; or assigning a terminal identifier index to each of all remote terminals mapped to a same radio link control channel.

To reduce overheads, in an embodiment, UE IDs are defined as indexes index of all remote UEs connected to a same relay UE. The relay terminal (relay UE) assigns a terminal identifier index to each of all remote terminals connected to the relay UE, and one remote terminal corresponds to one unique terminal identifier index.

For example, in a U2N architecture, one relay UE can serve an upper limit quantity of UEs due to its limited processing capacity. For example, if the upper limit is set to N, an index of remote UE communicating with a network via the relay UE may fall within an interval of [0, N−1], and each index uniquely identifies one remote UE. Inside the relay UE, correspondences between remote UE indexes and actual L2 IDs are stored, and thus correct communication can be performed. The NW needs to store mappings between UE identities carried in RRC signaling and remote UE indexes for correct transmission, reception, and processing of UE data.

Optionally, in an embodiment, the UE ID is defined as indexes of remote UE mapped to a same radio link control channel. That is, the relay terminal (relay UE) assigns a terminal identifier index to each of all remote terminals mapped to a same radio link control channel.

Optionally, the method for identifying remote terminal service further includes: transmitting the terminal identifier index to a peer communication device of a remote terminal corresponding to the terminal identifier index through a radio resource control RRC message or a UP procedure.

After assigning a terminal identifier index to a remote terminal, the relay terminal (relay UE) transmits the terminal identifier index to the peer communication device of the remote terminal corresponding to the terminal identifier index through a radio resource control RRC message or a UP procedure.

For example, when the first remote UE is connected to one relay UE, the relay UE may assign UE index=0 to the first remote UE and transmit an SRB0 message RRC Setup request of the remote UE to a network by using an UE index=0 and an RB ID. After receiving the setup message, a network-side device associates a UE identity in the setup message with UE index=0 in the relay UE. All subsequent downlink messages and downlink data transmitted to the UE are differentiated using the UE index=0 and a corresponding RB ID and transmitted to the relay UE over a relay bearer channel. Upon receipt, the relay UE may also identify a corresponding remote UE based on the UE index=0 and use a remote UE L2 ID to perform PC5 communication so as to transmit data to correct remote UE. The UE index is assigned by the relay UE and notified to the NW.

In some optional embodiments, the terminal identifier may also be a unique index assigned by a network-side device to a remote terminal.

When the first messages from all remote UEs connected to the relay UE are SRB0 messages, the network does not have any prior information about the remote UEs. Therefore, a special Uu path may be used, and such Uu RLC channel carries neither any remote UE ID nor any RB ID information, in other words, there is no adaptation layer header. SRB0 messages of all the remote UEs are put in this path for transmission without differentiation. Upon receipt, the NW parses a message to determine an identity of UE and then assigns a unique UE index among relay UEs to the UE.

There are two manners to inform the relay UE of the terminal identifier index (index) assigned to the remote UE by the network side.

Optionally, the method for identifying remote terminal service further includes: receiving a radio resource control RRC message from a network-side device, where the RRC message carries a terminal identifier index assigned by the network-side device to a remote terminal that has transmitted an SRB0 message.

Optionally, the network-side device informs the relay UE, through the RRC message between the network-side device and the relay UE, that the index has been assigned to the remote UE. Part of the RRC setup request (namely, the SRB0 message) may be used for differentiation of remote UEs in the RRC message. For example, 40 bits of the RRC setup request are used to identify remote UEs. Because the RRC setup request message contains UE identities, the network side identifies UE by copying all or part of this content. The relay UE needs to back up and buffer the RRC setup request message forwarded for the remote UE, so that upon receipt of a configuration message, the relay UE may know through comparison which remote UE the index is assigned to, and subsequently associate and store an L2 ID of the remote UE with the index for subsequent transmission of relay data.

Optionally, the method for identifying remote terminal service further includes: receiving a control protocol data unit/first data packet from a network-side device, where the control protocol data unit/first data packet carries identity information of a remote terminal that has transmitted an SRB0 message and a terminal identifier index assigned by the network-side device to the remote terminal that has transmitted an SRB0 message; and determining, based on the identity information, a remote terminal corresponding to the terminal identifier index.

The network-side device informs the relay UE of the index assignment through a user plane (UP) procedure, and specifically, through a control protocol data unit control PDU of the UP that carries the remote UE identity information in the setup request message and the index. After reading, the remote UE may inform the network-side device that a corresponding index has been assigned to the remote UE.

Optionally, the network-side device transmits a first data packet. The first data packet carries a newly assigned UE index and remote UE identity information. After parsing the first data packet, the relay UE may also create correct association between the remote UE and the index for subsequent transmission of relay data.

After the corresponding index of the remote UE is created, this index may be used to identify data of the remote UE in subsequent packet transmission and reception, thereby facilitating correct understanding of the data source. Generally speaking, not too many, for example, 32 or 16, remote UEs are connected to one relay UE. Therefore, the index used to differentiate remote UEs in this way only needs a few bits, not more than one byte, thereby significantly reducing overheads.

It should be noted that in a U2U architecture, a similar approach can be taken: the relay UE assigns a unique index to each of remote UEs connected to the relay UE to identify different remote UEs. A PC5 RRC between the relay UE and the remote UE may be used for informing the allocation.

Optionally, the bearer identifier includes one of the following: end-to-end bearer identifier, and indexes of bearers that are corresponding to a remote terminal and mapped to a same radio link control channel.

In some optional embodiments, the bearer identifier RB ID may directly use an end-to-end RB ID for communication between the remote UE and the NW. For example, remote UE Uu SRB0 has an RB ID=0, remote UE SRB1 has an RB ID=1, remote UE SRB2 has an RB ID=2, and remaining DRBs have an RB ID configured and assigned through an end-to-end RRC procedure.

In some optional embodiments, the bearer identifier RB ID may also be the indexes of bearers that are corresponding to a remote terminal and mapped to a same radio link control channel.

At present, a maximum of 32 end-to-end bearers can be supported, that is, an RB ID needs 5 bits to identify end-to-end bearers. However, for one remote UE, not too many RBs, for example, a maximum of 4 RBs, can be multiplexed to a same large transmit path because QoS needs to be the same or approximate. Therefore, the length of an RB ID can be reduced to 2 bits. In other words, RB mappings need to be informed. An example of the mappings is shown in Table 1 below.

TABLE 1

| RB mappings | |
|---|---|
| Before mapping | After mapping |
| RB 1 in Remote UE 1 | Channel 1, remote UE1, RB = 0 |
| RB 2 in Remote UE 1 | Channel 1, remote UE1, RB = 1 |
| RB 3 in Remote UE 1 | Channel 1, remote UE1, RB = 2 |
| RB 4 in Remote UE 1 | Channel 2, remote UE1, RB = 0 |
| RB 5 in Remote UE 1 | Channel 2, remote UE1, RB = 1 |
| . . . | . . . |

In other words, mapping of a free 32-bit traditional end-to-end RB ID to index y of RLC channel x needs to be notified. The decision is made based on the principle of QoS being the same or approximate. A corresponding RLC channel is selected, whether other RBs of the remote UE are mapped to the RLC channel is checked, and intra-group sorting may be performed for RBs mapped to a same RLC channel.

Mapping establishment and notification are performed in the following manner: For signaling radio bearers, because Uu SRBs (for the U2N scenario) and PC5 SRBs (for the U2U scenario) are limited in quantity and assume a clear role, and each remote UE must have these SRBs, a fixed mapping mode may be used to use a default mapping from SRB to default RLC channel n or configure such a mapping in advance while also fixing the RB indexes.

For DRBs, because DRBs have characteristics of suddenness and diversity, only after a service arrives, a base station configures a DRB for the relay UE through Uu RRC (for the U2N scenario), or the relay UE configures a DRB for remote UE at two ends through PC5 RRC (for the U2U scenario). After the configuration is completed, communication can be normally performed.

Optionally, the method for identifying remote terminal service further includes: assigning a bearer index to each of all remote terminals mapped to a same radio link control channel.

It can be understood that the relay UE assigns the bearer index to each of all remote terminals mapped to the same radio link control channel and configures the bearer index for corresponding remote UE through a PC5 RRC message. For example, between remote UE 1 and the relay UE, data of different target UE 2, target UE 3, and target UE 4 may be multiplexed, and assigned bearer indexes may correspond to an end-to-end bearer between UE 1 and UE 2, an end-to-end bearer between UE 1 and UE 3, and an end-to-end bearer between UE 1 and UE 4, respectively. For example, between the relay UE and target UE2, there are:

different source UE 1, source UE 5, and source UE 6, and therefore assigned bearer indexes may correspond to an end-to-end bearer between UE 1 and UE2, an end-to-end bearer between UE 5 and UE2, and an end-to-end bearer between UE 6 and UE2, respectively.

The U2N scenario is similar and not repeated herein.

In this embodiment of this application, the relay terminal or the network-side device assigns the terminal identifier index and/or the bearer marker to the remote UE to differentiate services of different remote UEs during remote UE service multiplexing, enabling the relay terminal to multiplex the services of the different remote terminals onto a same transmit path for transmission, thereby improving the transmission efficiency and having fewer resource overheads.

Optionally, on the basis of the foregoing embodiment, the method for identifying remote terminal service further includes: receiving a second message from the peer communication device; and forwarding the second message to a corresponding remote terminal based on a terminal identifier and/or bearer identifier carried in a packet header of the second message.

It can be understood that the relay UE receives the second message from the peer communication device. For example, if the first message is an RRC Setup request message, the second message is an RRC Setup message. Then, the second message is forwarded to the corresponding remote terminal based on the terminal identifier and/or bearer identifier carried in the packet header of the second message.

Optionally, on the basis of the foregoing embodiment, before the receiving a first message from a first remote terminal, the method further includes: in a case that the first remote terminal meets a relay communication setup condition and that link quality between the relay terminal and the first remote terminal and link quality between the relay terminal and a peer communication device meet a relay communication setup condition, interacting with the first remote terminal on a PC5 interface to determine that the relay terminal is capable of relaying a service for the first remote terminal. For example, the remote UE is at the edge of a cell and has RSRP less than a threshold configured by the network, and therefore cannot communicate directly with the NW, and data of the remote UE needs to be forwarded by the relay UE to the network. In this case, the first remote terminal meets the relay communication setup condition.

The relay UE also needs to meet a specified condition. Subsequent normal communication can be ensured only when the link quality between the relay terminal and the first remote terminal and the link quality between the relay terminal and the peer communication device meet the relay communication setup condition.

After the foregoing basic link conditions are satisfied, the relay UE and the relay UE need to exchange relay service information through a PC5 procedure, for example, for implementation of a discovery procedure, it is required to ensure that the relay UE can relay a service to be initiated by the remote UE.

Optionally, an adaptation layer header of the first message carries the terminal identifier of the first remote terminal and/or the bearer identifier of the first remote terminal.

It should be noted that the UE ID and the RB ID mentioned in this application may be used at an adaptation layer adaptation layer and included in an adaptation layer header, but is not limited to thereto, and may be used at all protocol layers for which data multiplexing is needed.

How bearers of different remote UE are differentiated using the UE ID and the RB ID is described below with reference to specific application scenarios.

In the U2N architecture, the L2 remote UE<->relay UE<->NW scenario is used as an example to describe how bearers of different remote UE are differentiated using the UE ID and RB ID so as to implement normal relay communication.

To begin with, regarding the meaning and value of the UE ID and RB ID, the following principle is used in this example: The UE ID is a PC5 link L2 ID, and the RB ID is an end-to-end bearer identifier. The following describes the process of the remote UE establishing L2 relay U2N communication and how bearer multiplexing being performed between the relay and the NW.

Step a. The remote UE meets a condition for establishing L2 relay U2N communication and finds a proper relay UE. For example, the remote UE is at the edge of a cell and has RSRP less than a threshold configured by the network, and therefore cannot communicate directly with the NW, and data of the remote UE needs to be forwarded by the relay UE to the network.

The relay UE also needs to meet a specified condition. For example, the link from the relay UE itself to the NW is good enough and has RSRP greater than a threshold configured by the network. Optionally, the link from the relay UE to the NW cannot be too good and has RSRP lower than a threshold configured by the network. The advantage of this is to avoid too much interference generated when UE at the center of the cell serves as the relay UE.

PC5 link quality between the remote UE and the relay UE also needs to meet a specified threshold, to be specific, PC5 RSRP (Reference Signal Received Power) is higher than the threshold to ensure that subsequent communication can be normally performed.

After the foregoing basic link conditions are satisfied, the relay UE and the relay UE need to exchange relay service information through a PC5 procedure, for example, for implementation of a discovery procedure, it is required to ensure that the relay UE can relay a service to be initiated by the remote UE.

Step b. After determining to relay a service for the remote UE, the relay UE needs to make some preparations on its own Uu interface, for example, configuring a default relay RLC channel so as to carry at least end-to-end RB data of the remote UE having no configured mapping.

For example, if the relay UE has not entered the connected state before, the relay UE needs to enter the connected state first to relay data and informs the network side that it requests data relaying for another remote UE. The network side needs to configure a default relay RLC channel for the relay UE. The default relay RLC channel has the following characteristics: being configured as RLC AM (Acknowledge Mode) or UM (UnAcknowledge Mode), having an adaptation layer and a header, where the adaptation layer header contains the UE ID and the RB ID, and no remote UE data without any mapping being mapped to the channel by default.

If the relay UE is already in the connected state and has its own Uu data for transmission or relay data from other remote UE for transmission, it is highly likely that a default relay RLC channel is already present and can carry remote UE data having no mapping.

For example, for a logical channel number on the Uu interface of the relay UE: 0 indicates SRB0 message of the relay UE, 1 indicates SRB1 message of the relay UE, 2 indicates SRB2 message of the relay UE, 4 indicates the first DRB of the relay UE, 5 indicates the second DRB of the relay UE, 10 indicates default relay RLC channel used to carry relay data having no mapping, and 11 to 13 indicate other relay RLC channels that carry data with different QoS and from other remote UEs having no configured mapping.

Step c. The remote UE transmits the first Uu message: an RRC Setup Request, where the message is transmitted to the NW but needs to be transmitted to the relay UE first for relaying. The remote UE transmits the first Uu message to the relay UE via the PC5 interface. After receiving the first message, the relay UE transmits the first message over its default relay RLC channel obtained in step b, where an adaptation header of a data packet carries the L2 ID and the RB ID of the remote UE, and since the first message is an SRB0 message, the RB ID is equal to 0.

Step d. The network side receives the data from the relay over the default relay RLC channel, processes the data, and responds to the data by transmitting an RRC Setup message (carrying the L2 ID and RB ID=0). It can be learned based on the UE ID that the remote UE is a new one (because a configuration of the UE has not been buffered). It can be learned based on RB ID=0 that the message is an SRB0 message from the remote UE, the message is parsed and processed normally to generate the RRC Setup message in response. The network side transmits the RRC Setup message over the downlink default relay RLC channel on the downlink and adds the L2 ID and RB ID=0 received as a UE ID of an adaptation header to indicate that the message is still to be transmitted over SRB0.

RRC Setup messages are generally for establishing SRB1s. Therefore, the network side also needs to configure how SRB1s of the relay UE are mapped on the Uu interface and transmits the configured mappings to the relay UE. In other words, the SRB1s of this relay UE may be mapped to an existing relay RLC channel or an established new relay RLC channel, where the relay UE is identified by the UE ID=L2 ID.

Step e. The relay UE receives the RRC setup message, finds corresponding remote UE based on the UE ID read from the adaptation header, and forwards the RRC Setup message to the corresponding remote UE on the PC5 interface.

Step f After receiving the RRC Setup message, the remote UE establishes an SRB1 according to a configuration in the message and transmits a subsequent RRC Setup complete message on the established SRB1.

Subsequent steps are not described in detail. The relay RLC channel mapping and configuration of the SRB1 on the Uu of the relay UE are prepared in advance, and the relay UE uses the L2 ID and RB ID=1 corresponding to the remote UE in later time to inform the NW that the message is an SRB1 message of the remote UE. This also applies to the downlink.

In addition, SRB2s and DRBs of the remote UE also share the similarity. Relay Uu RLC channel mappings are first configured for the SRB2s and DRBs through an SRB1 channel, namely, RRC signaling procedure, and then the configured relay Uu RLC channel mappings of the SRB2s and DRBs are transmitted to the remote UE.

After the establishment, between the relay and the NW, L2 IDs and end-to-end RB IDs may be used in one relay Uu RLC channel to clearly differentiate different remote UEs and specific bearer content (SRB0/1/2/DRB).

How bearers of different remote UE are differentiated using the UE ID and the RB ID in the U2U scenario is described below.

In the U2U architecture, the L2 source remote UE<->relay UE<->target remote UE scenario is used as an example to describe how bearers of different remote UE are differentiated using the UE ID and RB ID so as to implement normal relay communication.

To begin with, regarding the meaning and value of the UE ID and RB ID, the following principle is used in this example: The UE ID is a PC5 link L2 ID, and the RB ID is an end-to-end bearer identifier.

Between the relay UE and the target remote UE (referred to as the second hop for short), the relay UE may multiplex data from multiple source remote UEs (because their target remote UEs are a same UE) to reduce the number of possible bearers in the second hop. The source remote UEs are still differentiated by their respective L2 IDs that need to be identifiable by the target remote UE. For example, L2 IDs are exchanged in a discovery procedure, and the L2 IDs used herein may be the same as or different from an L2 ID used for PC5 communication between the source remote UE and the relay UE. If different, it indicates that the source remote UE has at least two L2 IDs, one of which is used for PC5 transmission with the relay UE, and the other of which is used by the source remote UE to identify itself during end-to-end communication with the target remote UE. In case of two L2 IDs, the relay UE needs to store mappings of the two L2 IDs for ease of usage in different scenarios. For example, the relay UE receives data from the source remote UE through the first L2 ID on the PC5 interface, needs to find the corresponding second L2 ID through the first L2 ID and put the second L2 ID into an adaptation layer header to identify the source remote UE in the second hop, and adds a corresponding RB ID to identify which bearer of which source remote UE. The RB ID is still an end-to-end RB ID between the source remote UE and the target remote UE. For example, SRB 0-3 corresponds to RB 0-3. Other DRBs are established between the source and the target through RRC signaling procedure and assigned with RB IDs before put into use.

Between the source remote UE and the relay UE (referred to as the first hop for short), the relay UE may multiplex data from a same source remote UE to different target remote UEs to reduce the number of possible bearers in the first hop. The target remote UEs are still differentiated by their respective L2 IDs that need to be identifiable by the source remote UE. For example, L2 IDs are exchanged in a discovery procedure, and the L2 IDs used herein may be the same as or different from an L2 ID used for PC5 communication between the target remote UE and the relay UE. If different, it indicates that the target remote UE has at least two L2 IDs, one of which is used for PC5 transmission with the relay UE, and the other of which is used by the target remote UE to identify itself during end-to-end communication with the source remote UE. In case of two L2 IDs, the relay UE needs to store mappings of the two L2 IDs for ease of usage in different scenarios, and adds a corresponding RB ID to identify which bearer of which source remote UE. The principle is the same as the above.

Optionally, to further reduce the complexity and have a same adaptation layer data packet format in the first hop and the second hop, it is also possible that both the source remote UE L2 ID and the target remote UE L2 ID are carried in the first hop, the former identifying different source UEs and the latter identifying different target UEs, where the latter may also play a routing role in a multi-hop network. Likewise, in addition to the UE ID, the RB ID is required to differentiate different bearers. The principle is the same as the above.

Figure 5:
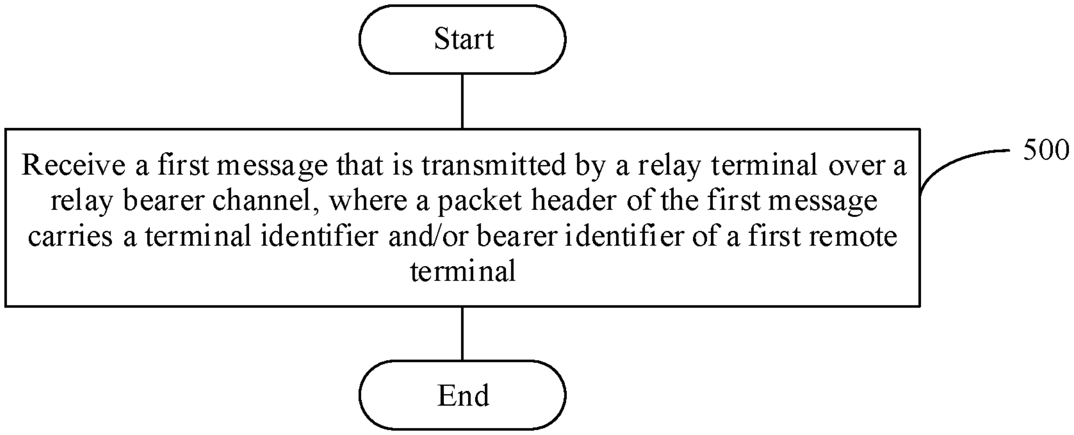
FIG. 5 is a second schematic flowchart of a method for identifying remote terminal service according to an embodiment of this application.

FIG. 5 is a second schematic flowchart of a method for identifying remote terminal service according to an embodiment of this application. The method is performed by a network-side device, and includes the following step. Step 500. Receive a first message that is transmitted by a relay terminal over a relay bearer channel, where a packet header of the first message carries a terminal identifier and/or bearer identifier of a first remote terminal. In this embodiment, the network-side device as a peer communication device receives the first message forwarded by the relay terminal on the relay inheritance channel. The network-side device can differentiate bearers for different remote UEs based on the UE ID and/or RB ID carried in the packet header of the first message, thereby identifying services of remote terminals (remote UE).

In this embodiment of this application, services of different remote UEs are differentiated during multiplexing of remote UE services so that a relay terminal can multiplex different services of different remote terminals onto a same transmit path for transmission, improving the transmission efficiency and improving identifiability of remote terminal services in end-to-end transmission, thereby guaranteeing the quality of service of remote terminal services, guaranteeing the overall efficiency, and guaranteeing the system efficiency while improving user experience.

In some optional embodiments, the terminal identifier includes one of the following: PC5 link layer-2 identifier PC5 link L2 ID or part of bits of PC5 link L2 ID; unique index of remote terminal on relay terminal; and unique index of remote terminal on network-side device. For related content of the terminal identifier, refer to the related descriptions in the foregoing embodiment. Details are not described herein again.

In some optional embodiments, the bearer identifier includes one of the following: end-to-end bearer identifier of remote terminal; and indexes of bearers that are corresponding to a remote terminal and mapped to a same radio link control channel. For related content of the bearer identifier, refer to the related descriptions in the foregoing embodiment. Details are not described herein again.

In some optional embodiments, the method for identifying remote terminal service further includes: transmitting radio bearer configuration information to the relay terminal; where the radio bearer configuration information carries mappings between radio bearer data types and radio link control channels.

To implement bearer multiplexing, the network-side device needs to configure corresponding radio link control channels for different types of radio bearer data. For example, default relay RLC channels are configured for SRB0 messages, and corresponding RLC channels are configured for non-SRB0 messages.

Optionally, the network-side device transmits radio bearer configuration information to the relay terminal, where the radio bearer configuration information carries mappings between radio bearer data types and radio link control channels.

In some optional embodiments, an adaptation layer header of the first message carries the terminal identifier of the first remote terminal and/or the bearer identifier of the first remote terminal.

In some optional embodiments, the method for identifying remote terminal service further includes: receiving an SRB0 message forwarded by the relay terminal, and determining identity information of a remote terminal that has transmitted the SRB0 message; and assigning a terminal identifier index to the remote terminal that has transmitted the SRB0 message, and transmitting the terminal identifier index to the relay terminal through a radio resource control RRC message or a UP procedure.

Optionally, the terminal identifier may also be a unique index assigned by a network-side device to a remote terminal.

The network receives the SRB0 message forwarded by the relay terminal and parses the SRB0 message to determine the identity information of the remote terminal that has transmitted the SRB0 message.

Then, the network assigns a terminal identifier index to the remote terminal that has transmitted the SRB0 message, and transmits the terminal identifier index to the relay terminal through a radio resource control RRC message or a UP procedure.

Optionally, the transmitting the terminal identifier index to the relay terminal through a radio resource control RRC message or a UP procedure includes: transmitting an RRC message to the relay terminal, where the RRC message carries the terminal identifier index; or transmitting a control protocol data unit/first data packet to the relay terminal through the UP procedure, where the control protocol data unit/first data packet carries the identity information of the remote terminal that has transmitted the SRB0 message and the terminal identifier index corresponding to the remote terminal that has transmitted the SRB0 message.

In some optional embodiments, the method for identifying remote terminal service further includes: assigning a unique terminal identifier index to each remote terminal within a coverage area.

In this embodiment of this application, another feasible manner of defining UE IDs is provided such that the length of the UE ID can fall within 24 bits of the full L2 ID and the length of a unique index in the relay. A unique identifier, generally 2 bytes in length, in a cell is assigned to remote UEs to differentiate different remote UEs.

Since in the U2N scenario, both the remote UE and the relay UE are in the connected state and under the control of the network, the network-side device may assign a unique index in its coverage area to each remote UE for differentiation and identification. The network-side device configures the index through either a control plane (CP) procedure or a user plane UP procedure, establishes the association between the remote UE and the index through manners such as a remote UE identity in setup request and various notification manners of a configured index, and uses the association in subsequent communication.

In the U2U scenario, the relay UE needs to relay a lot of data and is also highly likely to be in the connected state and subject to the scheduling of the network. Therefore, the association between the remote UE and the index may be obtained from the network-side device for subsequent communication. If the relay UE is not in the connected state or is off the network, the index can only be determined by the relay UE itself.

In some optional embodiments, the method for identifying remote terminal service further includes: assigning a bearer index to each of all remote terminals mapped to a same radio link control channel.

It can be understood that in the U2N scenario, the network-side device assigns a bearer index to each of all remote UEs mapped to a same radio link control channel and configures the bearer index for the relay UE in an RRC message. In the U2U scenario, if the relay UE is in the connected state, the relay UE reports a status of each remote UE to the network, and the network assigns the corresponding bearer indexes to each of all the remote UEs.

This embodiment of this application proposes a method for identifying remote UE service for a case that bearer multiplexing is required in a sidelink relay architecture, so that the relay UE can perform more orderly operations, thereby reducing the number of bearers and the scheduling and transmission complexity, and guaranteeing the service experience and system efficiency of the remote UE.

Figure 6:
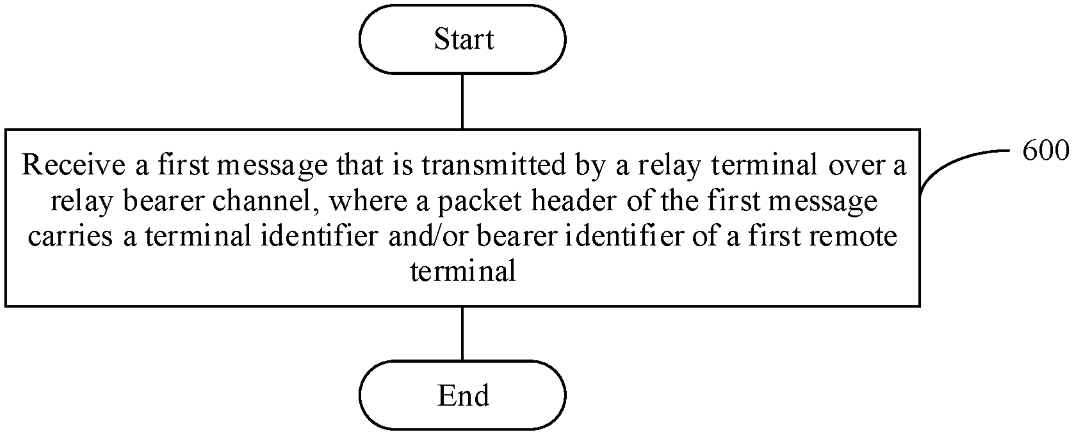
FIG. 6 is a third schematic flowchart of a method for identifying remote terminal service according to an embodiment of this application.

FIG. 6 is a third schematic flowchart of a method for identifying remote terminal service according to an embodiment of this application. The method is applied to a remote terminal and includes the following step.

Step 600. Receive a first message that is transmitted by a relay terminal over a relay bearer channel, where a packet header of the first message carries a terminal identifier of a first remote terminal and/or a bearer identifier of the first remote terminal.

In this embodiment, the remote terminal as a peer communication device receives the first message forwarded by the relay terminal on the relay inheritance channel.

The remote device can differentiate bearers for different remote UEs based on the UE ID and/or RB ID carried in the packet header of the first message, thereby identifying services of remote terminals (remote UE).

Optionally, the terminal identifier includes one of the following: PC5 link layer-2 identifier PC5 link L2 ID or part of bits of PC5 link L2 ID; unique index of remote terminal on relay terminal; and unique index of remote terminal on network-side device. For related content of the terminal identifier, refer to the related descriptions in the foregoing embodiment. Details are not described herein again.

Optionally, the bearer identifier includes one of the following: end-to-end bearer identifier of remote terminal; and indexes of bearers that are corresponding to a remote terminal and mapped to a same radio link control channel. For related content of the bearer identifier, refer to the related descriptions in the foregoing embodiment. Details are not described herein again.

Optionally, an adaptation layer header of the first message carries the terminal identifier and/or bearer identifier of the first remote terminal.

This embodiment of this application proposes a method for identifying remote UE service for a case that bearer multiplexing is required in a sidelink relay architecture, so that the relay UE can perform more orderly operations, thereby reducing the number of bearers and the scheduling and transmission complexity, and guaranteeing the service experience and system efficiency of the remote UE.

It should be noted that the method for identifying remote terminal service provided in this embodiment of this application may be performed by an apparatus for identifying remote terminal service or a control module, in such apparatus for identifying remote terminal service, for performing the method for identifying remote terminal service. In the embodiments of this application, an apparatus for identifying remote terminal service performing the method for identifying remote terminal service is used as an example to describe an apparatus for identifying remote terminal service provided in an embodiment of this application.

Figure 7:
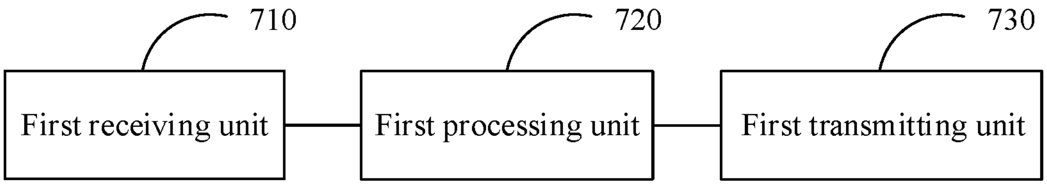
FIG. 7 is a first schematic structural diagram of an apparatus for identifying remote terminal service according to an embodiment of this application.

FIG. 7 is a first schematic structural diagram of an apparatus for identifying remote terminal service according to an embodiment of this application. The apparatus includes a first receiving unit 710, a first processing unit 720, and a first transmitting unit 730, where the first receiving unit 710 is configured to receive a first message from a first remote terminal; the first processing unit 720 is configured to determine a relay bearer channel for forwarding the first message; and the first transmitting unit 730 is configured to forward the first message to a peer communication device over the relay bearer channel, where a packet header of the first message carries a terminal identifier and/or bearer identifier of the first remote terminal; where the peer communication device is a network-side device, a next-hop relay terminal, or a second remote terminal.

In this embodiment of this application, services of different remote UEs are differentiated during multiplexing of remote UE services so that a relay terminal can multiplex different services of different remote terminals onto a same transmit path for transmission, improving the transmission efficiency and improving identifiability of remote terminal services in end-to-end transmission, thereby guaranteeing the quality of service of remote terminal services, guaranteeing the overall efficiency, and guaranteeing the system efficiency while improving user experience.

Optionally, the first processing unit 720 is configured to: determine a type of the first message based on the PC5 logical channel identifier corresponding to the first message, the SRB0 identifier of the first message, or the end-to-end bearer identifier of the first remote terminal; and in a case that the type of the first message is SRB0 message, determine that the relay bearer channel for forwarding the first message is a first default radio link control channel, or in a case that the type of the first message is not SRB0 message, determine, based on mappings between radio bearer data types and radio link control channels, that the relay bearer channel for forwarding the first message is a radio link control channel having a mapping to the type of the first message.

Optionally, the first processing unit 720 is further configured to: in a case that the type of the first message is not SRB0 message and that a radio link control channel having a mapping to the type of the first message is absent, determine that the relay bearer channel for forwarding the first message is a second default radio link control channel configured on a network side; where the second default radio link control channel is the same as or different from the first default radio link control channel. Optionally, the terminal identifier includes one of the following: PC5 link layer-2 identifier PC5 link L2 ID; part of bits of PC5 link L2 ID; unique index of remote terminal on relay terminal; and unique index of remote terminal on network-side device.

Optionally, the bearer identifier includes one of the following: end-to-end bearer identifier, and indexes of bearers that are corresponding to a remote terminal and mapped to a same radio link control channel.

Optionally, the apparatus further includes a first configuration unit configured to assign a terminal identifier index to each of all remote terminals connected to the relay terminal or assign a terminal identifier index to each of all remote terminals mapped to a same radio link control channel.

Optionally, the apparatus further includes a second transmitting unit configured to transmit the terminal identifier index to a peer communication device of a remote terminal corresponding to the terminal identifier index through a radio resource control RRC message or a UP procedure.

Optionally, the apparatus further includes a second receiving unit configured to receive a radio resource control RRC message from a network-side device, where the RRC message carries a terminal identifier index assigned by the network-side device to a remote terminal that has transmitted an SRB0 message.

Optionally, the apparatus further includes a third receiving unit configured to receive a control protocol data unit/first data packet from a network-side device, where the control protocol data unit/first data packet carries identity information of a remote terminal that has transmitted an SRB0 message and a terminal identifier index assigned by the network-side device to the remote terminal that has transmitted an SRB0 message; and a second processing unit configured to determine, based on the identity information, a remote terminal corresponding to the terminal identifier index.

Optionally, the apparatus further includes a second configuration unit configured to assign a bearer index to each of all remote terminals mapped to a same radio link control channel.

Optionally, the apparatus further includes a fourth receiving unit configured to receive a second message from the peer communication device; and a third processing unit configured to forward the second message to a corresponding remote terminal based on a terminal identifier and/or bearer identifier carried in a packet header of the second message.

Optionally, the apparatus further includes a fourth processing unit configured to: before the first message is received from the first remote terminal, in a case that the first remote terminal meets a relay communication setup condition and that link quality between the relay terminal and the first remote terminal and link quality between the relay terminal and a peer communication device meet a relay communication setup condition, interact with the first remote terminal on a PC5 interface to determine that the relay terminal is capable of relaying a service for the first remote terminal.

Optionally, an adaptation layer header of the first message carries the terminal identifier of the first remote terminal and/or the bearer identifier of the first remote terminal.

In this embodiment of this application, the relay terminal or the network-side device assigns the terminal identifier index and/or the bearer marker to the remote UE to differentiate services of different remote UEs during remote UE service multiplexing, enabling the relay terminal to multiplex the services of the different remote terminals onto a same transmit path for transmission, thereby improving the transmission efficiency and having fewer resource overheads.

The apparatus for identifying remote terminal service in this embodiment of this application may be an apparatus or may be a component, an integrated circuit, or a chip in a terminal. The apparatus may be a mobile terminal or a non-mobile terminal. For example, the mobile terminal may include but is not limited to the type of the remote terminal 11/relay terminal 13 listed above, and the non-mobile terminal may be a server, a network attached storage (NAS), a personal computer (PC), a television (TV), a teller machine, a self-service machine, or the like. This is not specifically limited in this embodiment of this application. The apparatus for identifying remote terminal service in this embodiment of this application may be an apparatus with an operating system. The operating system may be an Android operating system, may be an iOS operating system or may be another possible operating system. This is not specifically limited in this embodiment of this application.

The apparatus for identifying remote terminal service provided in this embodiment of this application can implement the processes that are implemented in the method embodiments of FIG. 3 and FIG. 4, with the same technical effects achieved. To avoid repetition, details are not described herein again.

Figure 8:
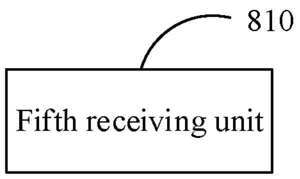
FIG. 8 is a second schematic structural diagram of an apparatus for identifying remote terminal service according to an embodiment of this application.

FIG. 8 is a second schematic structural diagram of an apparatus for identifying remote terminal service according to an embodiment of this application. The apparatus includes a fifth receiving unit 810 configured to receive a first message that is transmitted by a relay terminal over a relay bearer channel, where a packet header of the first message carries a terminal identifier and/or bearer identifier of a first remote terminal. Optionally, the terminal identifier includes one of the following: PC5 link layer-2 identifier PC5 link L2 ID or part of bits of PC5 link L2 ID; unique index of remote terminal on relay terminal; and unique index of remote terminal on network-side device.

Optionally, the bearer identifier includes one of the following: end-to-end bearer identifier of the remote terminal, and indexes of bearers that are corresponding to a remote terminal and mapped to a same radio link control channel.

Optionally, the apparatus further includes a third transmitting unit configured to transmit radio bearer configuration information to the relay terminal, where the radio bearer configuration information carries mappings between radio bearer data types and radio link control channels.

Optionally, an adaptation layer header of the first message carries the terminal identifier of the first remote terminal and/or the bearer identifier of the first remote terminal.

Optionally, the apparatus further includes a fifth processing unit configured to receive an SRB0 message forwarded by the relay terminal, and determine identity information of a remote terminal that has transmitted the SRB0 message; a third configuration unit configured to assign a terminal identifier index to the remote terminal that has transmitted the SRB0 message; and a fourth transmitting unit configured to transmit the terminal identifier index to the relay terminal through a radio resource control RRC message or a UP procedure.

Optionally, the fourth transmitting unit is configured to: transmit an RRC message to the relay terminal, where the RRC message carries the terminal identifier index; or transmit a control protocol data unit/first data packet to the relay terminal through the UP procedure, where the control protocol data unit/first data packet carries the identity information of the remote terminal that has transmitted the SRB0 message and the terminal identifier index corresponding to the remote terminal that has transmitted the SRB0 message.

Optionally, the apparatus further includes a fourth configuration unit configured to assign a unique terminal identifier index to each remote terminal within a coverage area.

Optionally, the apparatus further includes a fifth configuration unit configured to assign a bearer index to each of all remote terminals mapped to a same radio link control channel.

In this embodiment of this application, services of different remote UEs are differentiated during multiplexing of remote UE services so that a relay terminal can multiplex different services of different remote terminals onto a same transmit path for transmission, improving the transmission efficiency and improving identifiability of remote terminal services in end-to-end transmission, thereby guaranteeing the quality of service of remote terminal services, guaranteeing the overall efficiency, and guaranteeing the system efficiency while improving user experience.

The apparatus for identifying remote terminal service in this embodiment of this application may be an apparatus or may be a component, an integrated circuit, or a chip in a terminal. The apparatus may be a mobile terminal or a non-mobile terminal. For example, the mobile terminal may include but is not limited to the type of the remote terminal 11/relay terminal 13 listed above, and the non-mobile terminal may be a server, a network attached storage (NAS), a personal computer (PC), a television (TV), a teller machine, a self-service machine, or the like. This is not specifically limited in this embodiment of this application.

The apparatus for identifying remote terminal service in this embodiment of this application may be an apparatus with an operating system. The operating system may be an Android operating system, may be an iOS operating system or may be another possible operating system. This is not specifically limited in this embodiment of this application.

The apparatus for identifying remote terminal service provided in the embodiments of this application can implement the processes that are implemented in the method embodiment of FIG. 5, with the same technical effects achieved. To avoid repetition, details are not described herein again.

Figure 9:
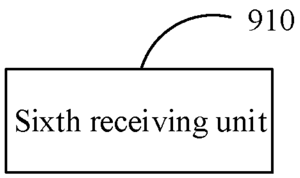
FIG. 9 is a third schematic structural diagram of an apparatus for identifying remote terminal service according to an embodiment of this application.

FIG. 9 is a third schematic structural diagram of an apparatus for identifying remote terminal service according to an embodiment of this application. The apparatus includes a sixth receiving unit 910 configured to receive a first message that is transmitted by a relay terminal over a relay bearer channel, where a packet header of the first message carries a terminal identifier of a first remote terminal and/or a bearer identifier of the first remote terminal.

Optionally, the terminal identifier includes one of the following: PC5 link layer-2 identifier PC5 link L2 ID; part of bits of PC5 link L2 ID; unique index of remote terminal on relay terminal; and unique index of remote terminal on network-side device. Optionally, the bearer identifier includes one of the following: end-to-end bearer identifier of remote terminal, and indexes of bearers that are corresponding to a remote terminal and mapped to a same radio link control channel.

Optionally, an adaptation layer header of the first message carries the terminal identifier and/or bearer identifier of the first remote terminal.

In this embodiment of this application, services of different remote UEs are differentiated during multiplexing of remote UE services so that a relay terminal can multiplex different services of different remote terminals onto a same transmit path for transmission, improving the transmission efficiency and improving identifiability of remote terminal services in end-to-end transmission, thereby guaranteeing the quality of service of remote terminal services, guaranteeing the overall efficiency, and guaranteeing the system efficiency while improving user experience.

The apparatus for identifying remote terminal service in this embodiment of this application may be an apparatus or may be a component, an integrated circuit, or a chip in a terminal. The apparatus may be a mobile terminal or a non-mobile terminal. For example, the mobile terminal may include but is not limited to the type of the remote terminal 11/relay terminal 13 listed above, and the non-mobile terminal may be a server, a network attached storage (NAS), a personal computer (PC), a television (TV), a teller machine, a self-service machine, or the like. This is not specifically limited in this embodiment of this application.

The apparatus for identifying remote terminal service in this embodiment of this application may be an apparatus with an operating system. The operating system may be an Android operating system, may be an iOS operating system or may be another possible operating system. This is not specifically limited in this embodiment of this application.

The apparatus for identifying remote terminal service provided in this embodiment of this application can implement the processes that are implemented in the method embodiment of FIG. 6, with the same technical effects achieved. To avoid repetition, details are not described herein again.

Figure 10:
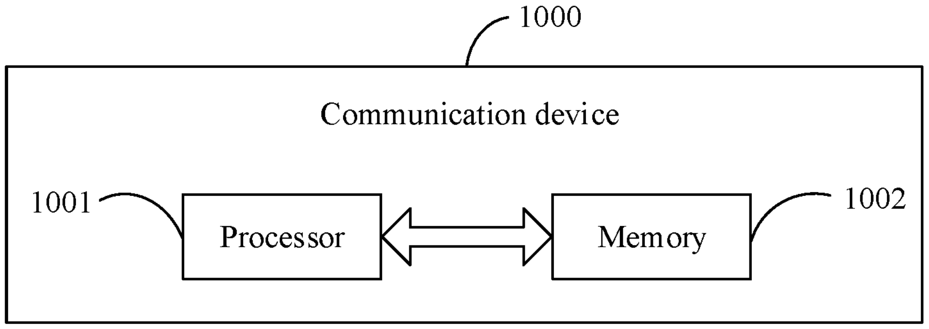
FIG. 10 is a schematic structural diagram of a communication device according to an embodiment of this application.

Optionally, as shown in FIG. 10, an embodiment of this application further provides a communication device 1000 including a processor 1001, a memory 1002, and a program or instructions stored in the memory 1002 and capable of running on the processor 1001. For example, if the communication device 1000 is a terminal, when the program or the instructions are executed by the processor 1001, the processes of the foregoing embodiments of the method for identifying remote terminal service are implemented, with the same technical effects achieved. If the communication device 1000 is a network-side device, when the program or the instructions are executed by the processor 1001, the processes of the foregoing embodiments of the method for identifying remote terminal service are implemented, with the same technical effects achieved. To avoid repetition, details are not described herein again.

Figure 11:
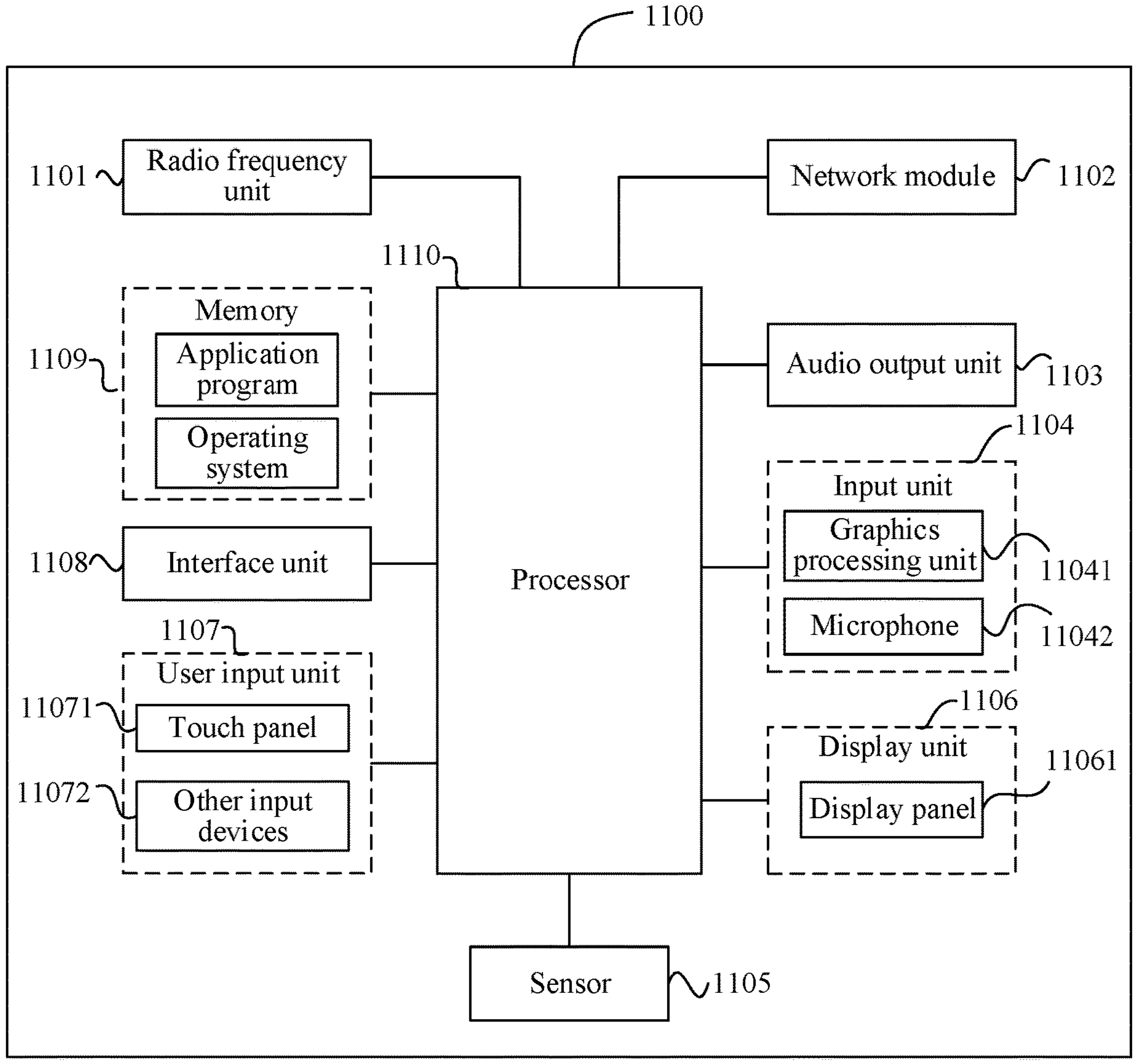
FIG. 11 is a schematic diagram of a hardware structure of a terminal according to an embodiment of this application.

FIG. 11 is a schematic diagram of a hardware structure of a terminal implementing an embodiment of this application.

The terminal 1100 includes but is not limited to components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

Persons skilled in the art can understand that the terminal 1100 may further include a power supply (for example, a battery) for supplying power to the components. The power supply may be logically connected to the processor 1110 through a power management system. In this way, functions such as charge management, discharge management, and power consumption management are implemented by using the power management system. The structure of the terminal shown in FIG. 11 does not constitute any limitation on the terminal. The terminal may include more or fewer components than shown in the figure, or combine some of the components, or arrange the components differently. Details are not described herein.

It should be understood that in this embodiment of this application, the input unit 1104 may include a graphics processing unit (GPU) 11041 and a microphone 11042. The graphics processing unit 11041 processes image data of a static picture or a video that is obtained by an image capture apparatus (for example, a camera) in a video capture mode or an image capture mode. The display unit 1106 may include a display panel 11061, and the display panel 11061 may be configured in a form of a liquid crystal display, an organic light-emitting diode, or the like. The user input unit 1107 includes a touch panel 11071 and other input devices 11072. The touch panel 11071 is also referred to as a touchscreen. The touch panel 11071 may include two parts: a touch detection apparatus and a touch controller. The other input devices 11072 may include but are not limited to a physical keyboard, a functional button (such as a volume control button or a power on/off button), a trackball, a mouse, and a joystick. Details are not described herein.

In this embodiment of this application, the radio frequency unit 1101 sends downlink data received from a network-side device to the processor 1110 for processing, and in addition, sends uplink data to the network-side device. Generally, the radio frequency unit 1101 includes but is not limited to an antenna, at least one amplifier, a transceiver, a coupler, a low noise amplifier, and a duplexer.

The memory 1109 may be configured to store software programs or instructions and various data. The memory 1109 may mainly include a program or instruction storage area and a data storage area. The program or instruction storage area may store an operating system, an application program or instruction required by at least one function (for example, a sound play function and an image play function), and the like. In addition, the memory 1109 may include high-speed random access memory and may also include non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or other non-volatile solid-state storage devices.

The processor 1110 may include one or more processing units. Optionally, the processor 1110 may integrate an application processor and a modem processor. The application processor mainly processes an operating system, a user interface, an application program or instruction, or the like. The modem processor mainly processes wireless communication, for example, a baseband processor. It can be understood that the modem processor may alternatively be not integrated in the processor 1110. The radio frequency unit 1101 is configured to receive a first message from a first remote terminal. The processor 1110 is configured to: determine a relay bearer channel for forwarding the first message; and forward the first message to a peer communication device over the relay bearer channel, where a packet header of the first message carries a terminal identifier and/or bearer identifier of the first remote terminal; where the peer communication device is a network-side device, a next-hop relay terminal, or a second remote terminal.

In this embodiment of this application, services of different remote UEs are differentiated during multiplexing of remote UE services so that a relay terminal can multiplex different services of different remote terminals onto a same transmit path for transmission, improving the transmission efficiency and improving identifiability of remote terminal services in end-to-end transmission, thereby guaranteeing the quality of service of remote terminal services, guaranteeing the overall efficiency, and guaranteeing the system efficiency while improving user experience.

Optionally, the processor 1110 is configured to: determine a type of the first message based on a PC5 logical channel identifier corresponding to the first message, an SRB0 identifier of the first message, or an end-to-end bearer identifier of the first remote terminal; and in a case that the type of the first message is SRB0 message, determine that the relay bearer channel for forwarding the first message is a first default radio link control channel, or in a case that the type of the first message is not SRB0 message, determine, based on mappings between radio bearer data types and radio link control channels, that the relay bearer channel for forwarding the first message is a radio link control channel having a mapping to the type of the first message.

Optionally, the processor 1110 is further configured to: in a case that the type of the first message is not SRB0 message and that a radio link control channel having a mapping to the type of the first message is absent, determine that the relay bearer channel for forwarding the first message is a second default radio link control channel configured on a network side, where the second default radio link control channel is the same as or different from the first default radio link control channel.

Optionally, the terminal identifier includes one of the following: PC5 link layer-2 identifier PC5 link L2 ID; part of bits of PC5 link L2 ID; unique index of remote terminal on relay terminal; and unique index of remote terminal on network-side device.

Optionally, the bearer identifier includes one of the following: end-to-end bearer identifier, and indexes of bearers that are corresponding to a remote terminal and mapped to a same radio link control channel.

Optionally, the processor 1110 is further configured to assign a terminal identifier index to each of all remote terminals connected to the relay terminal or assign a terminal identifier index to each of all remote terminals mapped to a same radio link control channel.

Optionally, the processor 1110 is further configured to transmit the terminal identifier index to a peer communication device of a remote terminal corresponding to the terminal identifier index through a radio resource control RRC message or a UP procedure.

Optionally, the processor 1110 is further configured to receive a radio resource control RRC message from a network-side device, where the RRC message carries a terminal identifier index assigned by the network-side device to a remote terminal that has transmitted an SRB0 message.

Optionally, the processor 1110 is further configured to: receive a control protocol data unit/first data packet from a network-side device, where the control protocol data unit/first data packet carries identity information of a remote terminal that has transmitted an SRB0 message and a terminal identifier index assigned by the network-side device to the remote terminal that has transmitted an SRB0 message; and determine, based on the identity information, a remote terminal corresponding to the terminal identifier index.

Optionally, the processor 1110 is further configured to assign a bearer index to each of all remote terminals mapped to a same radio link control channel.

Optionally, the processor 1110 is further configured to: receive a second message from the peer communication device; and forward the second message to a corresponding remote terminal based on a terminal identifier and/or bearer identifier carried in a packet header of the second message.

Optionally, the processor 1110 is further configured to: in a case that the first remote terminal meets a relay communication setup condition and that link quality between the relay terminal and the first remote terminal and link quality between the relay terminal and a peer communication device meet a relay communication setup condition, interact with the first remote terminal on a PC5 interface to determine that the relay terminal is capable of relaying a service for the first remote terminal.

Optionally, an adaptation layer header of the first message carries the terminal identifier of the first remote terminal and/or the bearer identifier of the first remote terminal.

In this embodiment of this application, the relay terminal or the network-side device assigns the terminal identifier index and/or the bearer marker to the remote UE to differentiate services of different remote UEs during remote UE service multiplexing, enabling the relay terminal to multiplex the services of the different remote terminals onto a same transmit path for transmission, thereby improving the transmission efficiency and having fewer resource overheads.

In an embodiment, optionally, the radio frequency unit 1101 is configured to receive a first message that is transmitted by a relay terminal over a relay bearer channel, where a packet header of the first message carries a terminal identifier of a first remote terminal and/or a bearer identifier of the first remote terminal.

Optionally, the terminal identifier includes one of the following: PC5 link layer-2 identifier PC5 link L2 ID; part of bits of PC5 link L2 ID; unique index of remote terminal on relay terminal; and unique index of remote terminal on network-side device.

Optionally, the bearer identifier includes one of the following: end-to-end bearer identifier of the remote terminal, and indexes of bearers that are corresponding to a remote terminal and mapped to a same radio link control channel.

Optionally, an adaptation layer header of the first message carries the terminal identifier and/or bearer identifier of the first remote terminal.

This embodiment of this application proposes a method for identifying remote UE service for a case that bearer multiplexing is required in a sidelink relay architecture, so that the relay UE can perform more orderly operations, thereby reducing the number of bearers and the scheduling and transmission complexity, and guaranteeing the service experience and system efficiency of the remote UE.

Figure 12:
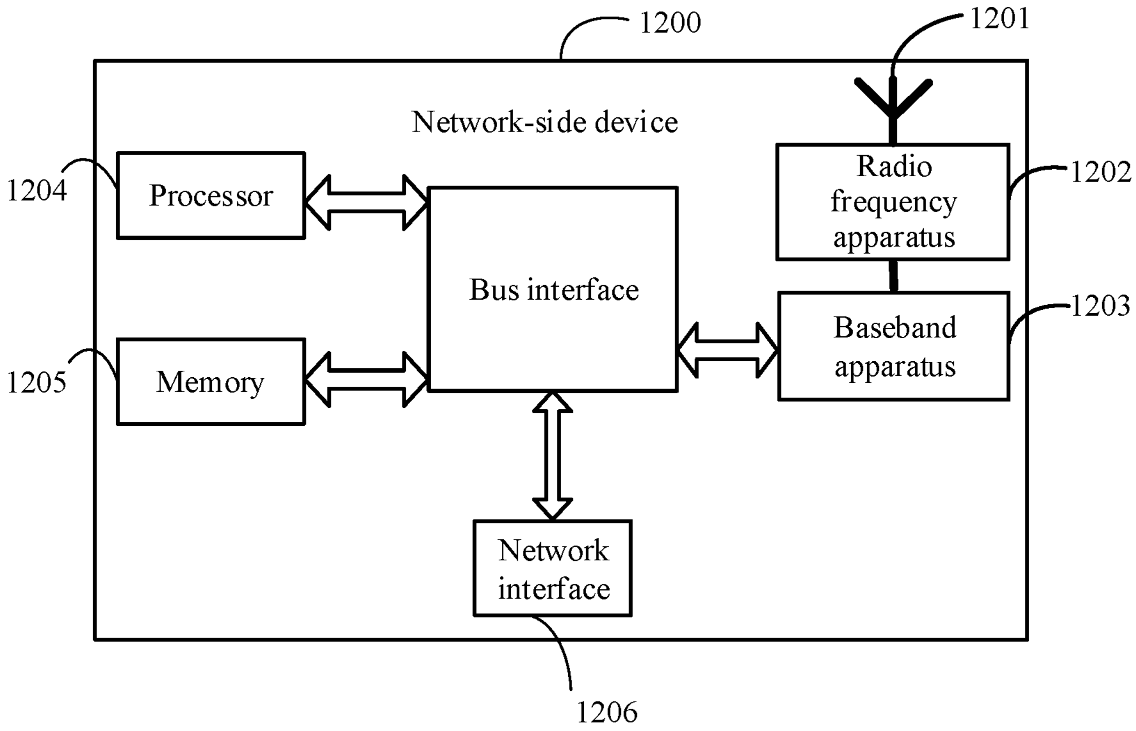
FIG. 12 is a schematic diagram of a hardware structure of a network-side device according to an embodiment of this application.

An embodiment of this application further provides a network-side device. As shown in FIG. 12, the network device 1200 includes an antenna 1201, a radio frequency apparatus 1202, and a baseband apparatus 1203. The antenna 1201 is connected to the radio frequency apparatus 1202. In an uplink direction, the radio frequency apparatus 1202 receives information by using the antenna 1201, and sends the received information to the baseband apparatus 1203 for processing. In a downlink direction, the baseband apparatus 1203 processes to-be-transmitted information, and transmits the information to the radio frequency apparatus 1202; and the radio frequency apparatus 1202 processes the received information and then transmits the information by using the antenna 1201.

The frequency band processing apparatus may be located in the baseband apparatus 1203. The method performed by the network-side device in the foregoing embodiment may be implemented in the baseband apparatus 1203, and the baseband apparatus 1203 includes a processor 1204 and a memory 1205.

The baseband apparatus 1203 may include, for example, at least one baseband board, where a plurality of chips are disposed on the baseband board. As shown in FIG. 12, one of the chips is, for example, the processor 1204, connected to the memory 1205, to invoke the program in the memory 1205 to perform the operations of the network device shown in the foregoing method embodiment.

The baseband apparatus 1203 may further include a network interface 1206 configured to exchange information with the radio frequency apparatus 1202, where the interface is, for example, a common public radio interface (CPRI).

Specifically, the network-side device in this embodiment of this application further includes instructions or a program stored in the memory 1205 and capable of running on the processor 1204. The processor 1204 invokes the instructions or program in the memory 1205 to perform the method performed by the modules shown in FIG. 8, with the same technical effects achieved. To avoid repetition, details are not described herein again.

An embodiment of this application further provides a readable storage medium, where the readable storage medium stores a program or instructions, and when the program or the instructions are executed by a processor, the processes of the foregoing embodiments of the method for identifying remote terminal service are implemented, with the same technical effects achieved. To avoid repetition, details are not described herein again.

The processor is the processor in the terminal in the foregoing embodiments. The readable storage medium includes a computer-readable storage medium such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions of a network-side device to implement the processes of the foregoing embodiments of the method for identifying remote terminal service, with the same technical effects achieved. To avoid repetition, details are not described herein again.

It should be understood that the chip mentioned in embodiment of this application may also be referred to as a system on a chip or system-on-chip.

An embodiment of this application further provides a computer software product, where the computer software product is executed by at least one processor to implement the processes of the foregoing embodiments of the method for identifying remote terminal service, with the same technical effects achieved. To avoid repetition, details are not described herein again.

It should be noted that the computer software product may be a computer program or a program product. It should be noted that in this specification, the terms "include", "comprise", or any of their variants are intended to cover a non-exclusive inclusion, such that a process, a method, an article, or an apparatus that includes a series of elements includes not only those elements but also other elements that are not expressly listed, or further includes elements inherent to such process, method, article, or apparatus. Without more restrictions, an element preceded by the statement "includes a . . . " does not preclude the presence of other identical elements in the process, method, article, or apparatus that includes the element. In addition, it should be noted that the scopes of the method and apparatus in the embodiments of this application are not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

From the foregoing description of the embodiments, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application have been described with reference to the accompanying drawings. However, this application is not limited to the foregoing specific implementations. These specific implementations are merely for illustration rather than limitation. Inspired by this application, persons of ordinary skill in the art may develop many other forms which do not depart from the essence of this application and the protection scope of the claims, and all such forms shall fall within the protection scope of this application.

What is claimed is:

1. A method for identifying a remote terminal service, comprising:

receiving, by a relay terminal, a first message from a first remote terminal via a PC5 interface, wherein the first message does not comprise a user equipment identifier (UE ID) and a bearer identifier of the first remote terminal;

determining, by the relay terminal, a relay bearer channel for forwarding the first message; and forwarding, by the relay terminal, a second message to a network-side device over the relay bearer channel, wherein the second message carries the UE ID and the bearer identifier of the first remote terminal, wherein the UE ID comprises a unique index of the first remote terminal on the relay terminal;

wherein the bearer identifier is used for determining that a type of the first message is signaling radio bearer 0 (SRB0).

2. The method for identifying the remote terminal service according to claim 1, wherein the determining, by the relay terminal, a relay bearer channel for forwarding the first message comprises:

determining, by the relay terminal, the type of the first message based on a PC5 logical channel identifier corresponding to the first message; and determining, by the relay terminal, a relay radio link control (RLC) channel for forwarding the first message according to whether the type of the first message is SRB0.

3. The method for identifying the remote terminal service according to claim 1, further comprising:

receiving, by the relay terminal, a radio resource control (RRC) setup message from the network-side device, wherein the RRC setup message carries the UE ID assigned by the network-side device to the first remote terminal.

4. The method for identifying the remote terminal service according to claim 1, wherein an adaptation layer header of the second message carries the UE ID of the first remote terminal and the bearer identifier of the first remote terminal.

5. The method for identifying remote terminal service according to claim 1, wherein the first message and the second message are both RRC setup request messages.

6. A method for identifying a remote terminal service, comprising:

receiving, by a network-side device, a second message that is transmitted by a relay terminal over a relay bearer channel; wherein:

the second message carries a user equipment identifier (UE ID) and a bearer identifier of a first remote terminal, wherein the UE ID comprises a unique index of the first remote terminal on the relay terminal; and a first message transmitted by the first remote terminal via a PC5 interface is used for determining the relay bearer channel, the first message does not comprise the UE ID and the bearer identifier of the first remote terminal, and the bearer identifier is used for determining that a type of the first message is signaling radio bearer 0 (SRB0).

7. The method for identifying remote terminal service according to claim 6, further comprising:

transmitting, by the network-side device, a radio resource control (RRC) setup message to the relay terminal, wherein the RRC setup message carries the UE ID assigned by the network-side device to the first remote terminal.

8. The method for identifying remote terminal service according to claim 6, wherein the first message and the second message are both RRC setup request messages.

9. The method for identifying remote terminal service according to claim 6, wherein an adaptation layer header of the second message carries the UE ID of the first remote terminal and the bearer identifier of the first remote terminal.

10. A method for identifying a remote terminal service, comprising:

sending, by a first remote terminal, a first message to a relay terminal via a PC5 interface, wherein the first message does not comprise a user equipment identifier (UE ID) and a bearer identifier of the first remote terminal;

wherein the first message is used by the relay terminal to determine a relay bearer channel and forwarding a second message to a network-side device over the relay bearer channel;

wherein the second message carries the UE ID and the bearer identifier of the first remote terminal, the UE ID comprises a unique index of the first remote terminal on the relay terminal, and the bearer identifier is used for determining that a type of the first message is signaling radio bearer 0 (SRB0).

11. The method for identifying remote terminal service according to claim 10, wherein an adaptation layer header of the second message carries the UE ID and the bearer identifier of the first remote terminal.

12. The method for identifying remote terminal service according to claim 10, wherein the first message and the second message are both RRC setup request messages.

13. A terminal, comprising at least one hardware processor, a memory, and a program or instructions stored in the memory and capable of running on the at least one hardware processor, wherein when the program or the instructions are executed by the at least one hardware processor, the method for identifying remote terminal service according to claim 1 is implemented.

14. A terminal, comprising at least one hardware processor, a memory, and a program or instructions stored in the memory and capable of running on the at least one hardware processor, wherein when the program or the instructions are executed by the at least one hardware processor, the method for identifying remote terminal service according to claim 10 is implemented.

15. A network-side device, comprising at least one hardware processor, a memory, and a program or instructions stored in the memory and capable of running on the at least one hardware processor, wherein when the program or the instructions are executed by the at least one hardware processor, the method for identifying remote terminal service according to claim 6 is implemented.

* * * * *